US012811372B2

(12) United States Patent
Dowell et al.

(10) Patent No.: US 12,811,372 B2
(45) Date of Patent: Nov. 24, 2026

(54) POWER DISTRIBUTION UNIT WITH THREE ZONE CONTROL DOORS

(71) Applicant: Vertiv Corporation, Columbus, OH (US)

(72) Inventors: Danny Dowell, Delaware, OH (US); Phillip Stiger, Marion, OH (US); John Van Fossen, Powell, OH (US)

(73) Assignee: Vertiv Corporation, Columbus, OH (US)

( * ) Notice: Subject to any disclaimer, the term of this patent is extended or adjusted under 35 U.S.C. 154(b) by 321 days.

(21) Appl. No.: 18/439,246

(22) Filed: Feb. 12, 2024

(65) Prior Publication Data

US 2024/0275141 A1 Aug. 15, 2024

Related U.S. Application Data

(60) Provisional application No. 63/445,157, filed on Feb. 13, 2023.

(51) Int. Cl.
*H02B 1/38* (2006.01)
*H02B 1/06* (2006.01)
*H02B 1/18* (2006.01)
*H02B 1/24* (2006.01)

(52) U.S. Cl.
CPC ................. *H02B 1/38* (2013.01); *H02B 1/06* (2013.01); *H02B 1/18* (2013.01); *H02B 1/24* (2013.01)

(58) Field of Classification Search
CPC ... H02B 1/38; H02B 1/06; H02B 1/18; H02B 1/24; H02B 13/005
See application file for complete search history.

(56) References Cited

U.S. PATENT DOCUMENTS

| | | | | |
|---|---|---|---|---|
| 11,388,843 | B2 | 7/2022 | Ebermann et al. | |
| 11,489,317 | B2 | 11/2022 | Harr et al. | |
| 2006/0221524 | A1* | 10/2006 | Kelly | G06F 1/189 361/93.1 |
| 2008/0062619 | A1* | 3/2008 | Parker | H02B 1/20 361/601 |
| 2018/0205206 | A1* | 7/2018 | Bazhinov | G06Q 50/06 |
| 2021/0050723 | A1* | 2/2021 | Lan | H05K 7/20718 |
| 2022/0085580 | A1* | 3/2022 | Kuzniak | G01R 31/3275 |
| 2022/0217864 | A1 | 7/2022 | Xiang et al. | |

FOREIGN PATENT DOCUMENTS

| | | | |
|---|---|---|---|
| CA | 2749277 | A1 | 12/2011 |
| EP | 1983625 | A1 | 10/2008 |

* cited by examiner

*Primary Examiner* — Thienvu V Tran
*Assistant Examiner* — Muaamar Qahtan Al-Taweel
(74) *Attorney, Agent, or Firm* — Dickinson Wright PLLC

(57) ABSTRACT

A power distribution unit of an equipment cabinet is provided including: a non-isolatable high voltage area, an isolatable high voltage area, electrically isolated from the non-isolatable high voltage area, and a low voltage area, electrically isolated from each of the non-isolatable high voltage area and the isolatable high voltage area, and at least one disconnect device, electrically disposed between a high voltage power source and the isolatable high voltage area, such that opening of the at least one disconnect device disconnects the isolatable high voltage area from the high voltage power source.

16 Claims, 6 Drawing Sheets

POWER DISTRIBUTION UNIT WITH THREE ZONE CONTROL DOORS

CROSS-REFERENCES TO RELATED APPLICATIONS

This U.S. Utility Patent Application claims priority to U.S. Provisional Patent Application Ser. No. 63/445,157, filed Feb. 13, 2023, which is incorporated herein by reference in its entirety.

BACKGROUND

1. Field

Apparatuses and methods consistent with example embodiments relate to electrical/electronics equipment units, and more particularly to an electrical/electronics power distribution unit with three zone control doors.

1. Description of the Related Art

Power distribution equipment units are typically used to receive output power from a power transformer cabinet and to distribute the received power via a plurality of output distribution power cables to a plurality of different power output panelboards. Such power distribution units with built-in monitoring and controls require printed circuit boards, power supplies, and other electronic modules which are installed in the unit in secure and protected location(s). The components may be separated into a low voltage compartment and a hazardous voltage compartment in order to enable safe servicing of the low voltage components.

The use of separate control compartments for low voltage components and for hazardous voltage components allow the servicing of the low voltage components without the need for protective safety equipment or shutting down the unit which is required when servicing the hazardous voltage components. Nonetheless, even with this separation, shutdown and safety equipment use is still required when servicing components in the hazardous voltage compartment.

SUMMARY

Example embodiments may address at least the above problems and/or disadvantages and other disadvantages not described above. Also, example embodiments are not required to overcome the disadvantages described above, and may not overcome any of the problems described above.

One or more example embodiments may provide a three-section design allowing for some of the components, otherwise located in the hazardous voltage compartment to be isolated without affecting the equipment performance, resulting in serviceable hazardous voltage components. One or more example embodiments may provide a three-section design allowing for isolation of the components with the highest temperatures to be isolated, physically and electrically, from the remainder of the components, improving cooling performance.

According to an aspect of an example embodiment, a power distribution unit comprises: a non-isolatable high voltage (NIHV) area, an isolatable high voltage (IHV) area, electrically isolated from the non-isolatable high voltage area, and a low voltage (LV) area, electrically isolated from each of the non-isolatable high voltage area and the isolatable high voltage area, and at least one disconnect device, electrically disposed between a high voltage power source and the isolatable high voltage area, such that removal of the at least one disconnect device disconnects the isolatable high voltage area from the high voltage power source.

The power distribution unit may further comprise three cover panels, each one of the three cover panels mounted over a respective one of the non-isolatable high voltage area, the isolatable high voltage area, and the low voltage area.

The power distribution unit may further comprise a unit sensing circuit board disposed in the non-isolatable high voltage area.

The power distribution unit may further comprise a control input circuit board disposed in the low voltage area.

According to an aspect of another example embodiment, an equipment cabinet is provided including: a cabinet frame comprising: a pair of vertical walls, a top wall connected to each of the pair of vertical wall panels, and a bottom wall connected to each of the pair of vertical wall panels; and a door connected to the cabinet frame, the door comprising a power distribution unit as described above.

According to an aspect of another example embodiment, a method is provided of accessing an NIHV area of a power distribution unit comprising an IHV area, the NIHV area, and a LV area, wherein the NIHV area, the IHV area, and the LV area are each electrically isolated from each other. The method may comprise disconnecting a main input circuit breaker from the power distribution unit; locking out input power upstream from the power distribution unit; unlatching and opening a cover of the NIHV area; and validating there is no energy in the NIHV area prior to accessing any units disposed in the NIHV.

The validating may comprise using a digital multimeter.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
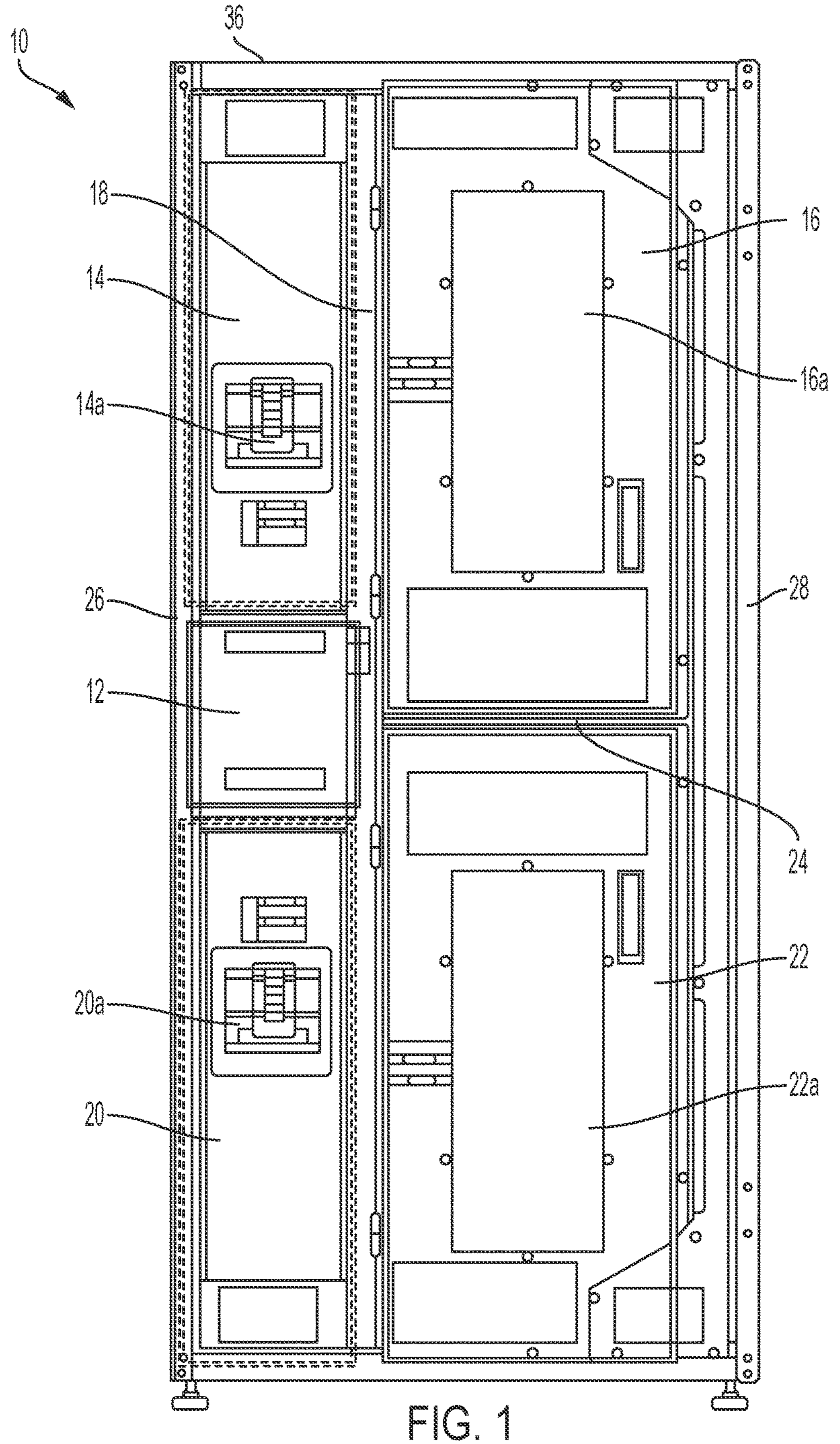
FIG. 1 illustrates an equipment cabinet according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described herein in detail.

Referring to FIG. 1, an example electrical/electronics equipment cabinet 10 (hereinafter simply "cabinet 10") is shown. The cabinet 10 includes customer cable input and output areas 21 and 22 at the top and bottom of the cabinet 10, respectively. The cabinet 10 also includes a control area 12, a main input circuit breaker 14, output circuit breakers 15, an output panel board 23, current transformers/sensors 20*a*, a customer cable routing area 19, a control and sense wiring routing trough 18, remote communication cards 17, and a human machine interface 16.

Control areas require printed circuit boards, power supplies, and other electronic modules which must be installed in secure and protected location(s). In the related art, the control area is simply divided into a high/hazardous voltage are and a low voltage area.

Figure 2:
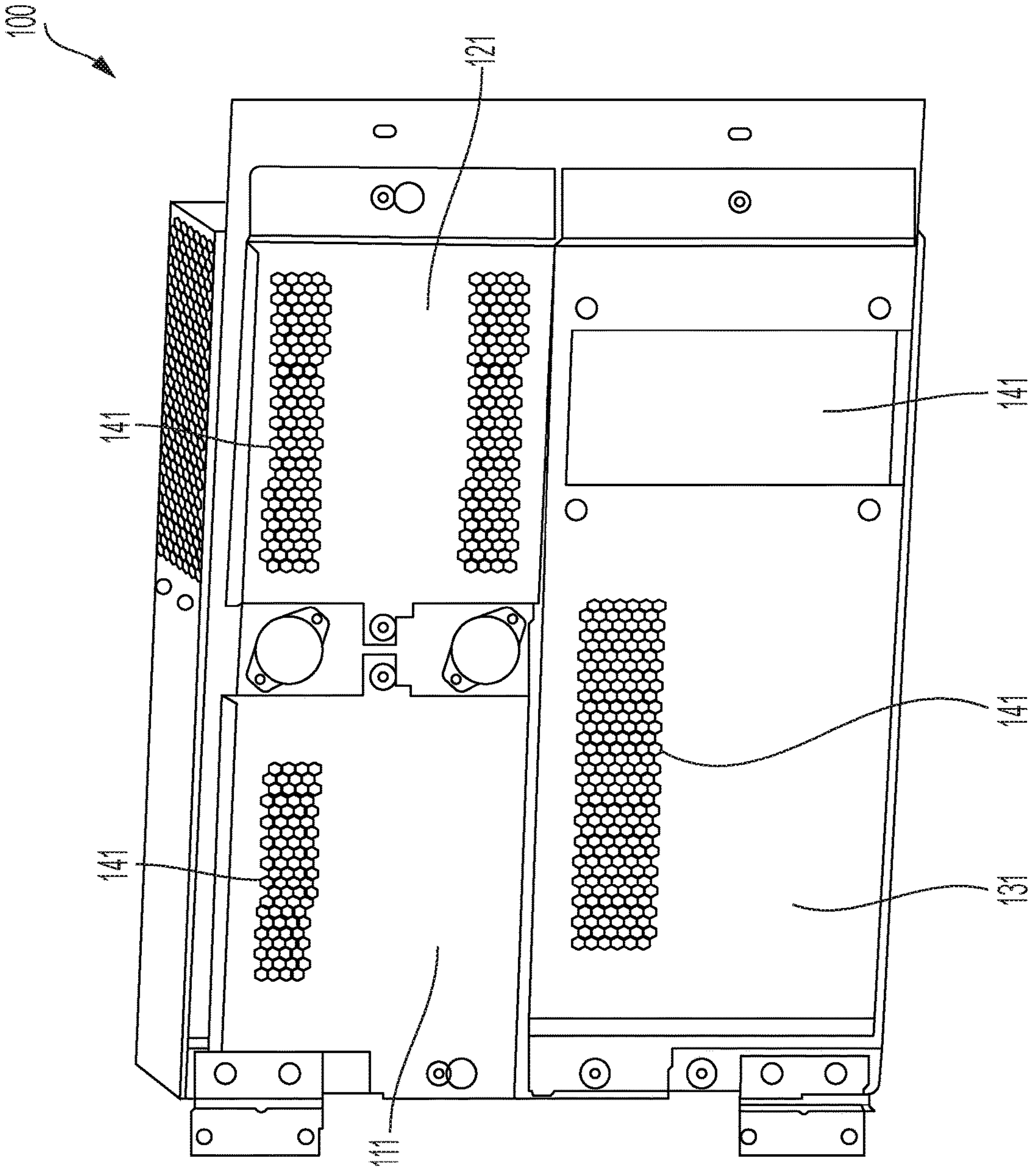
FIG. 2 illustrates an exterior of a power distribution unit, according to an example embodiment.
Figure 3:
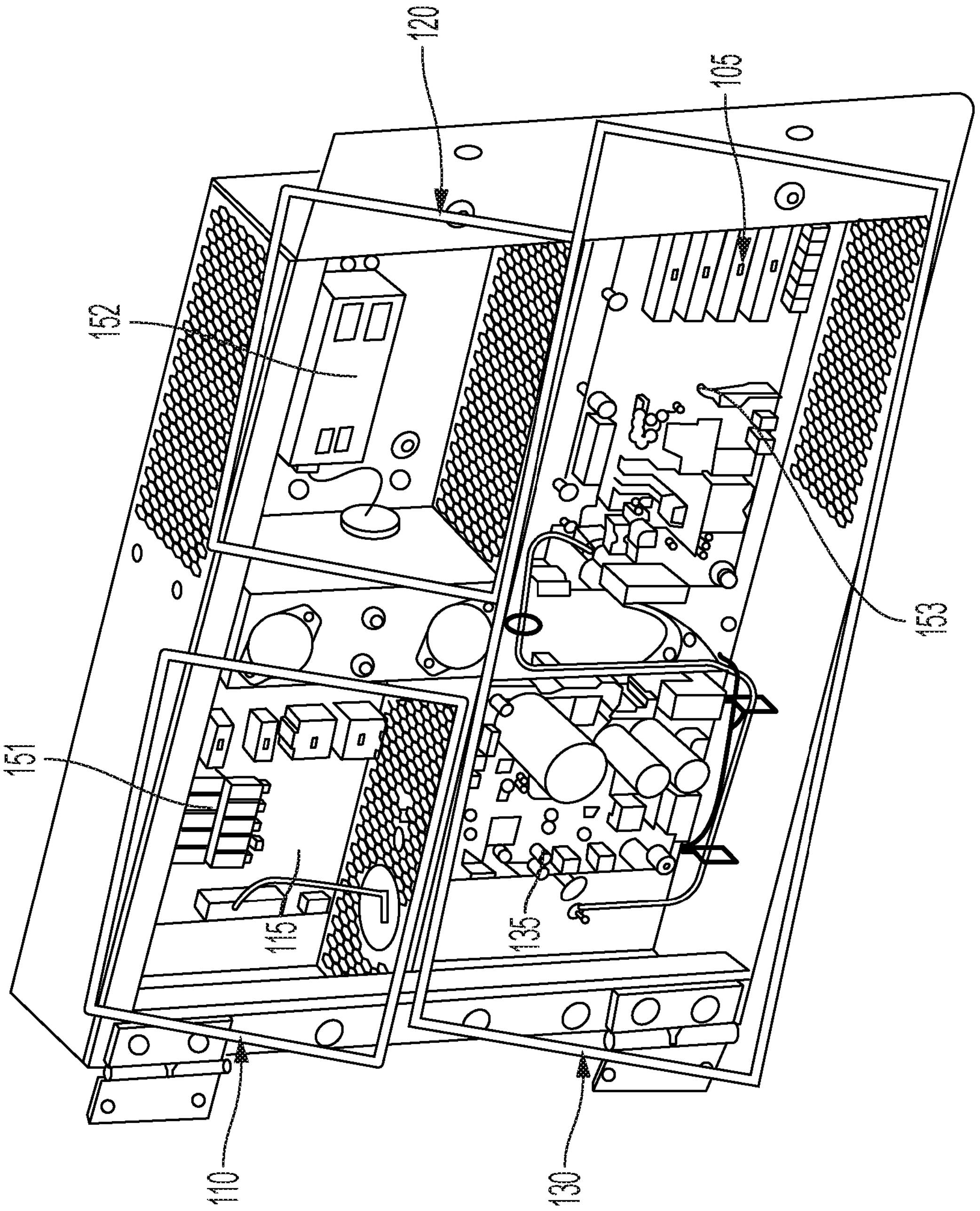
FIG. 3 illustrates an interior of the power distribution unit of FIG. 2.

FIG. 2 illustrates an exterior of a power distribution unit 100, according to an example embodiment. As shown in FIG. 1, the power distribution unit 100 may be disposed within the control area 12 of an electrical/electronics equipment cabinet 10. FIG. 3 illustrates an interior of the power distribution unit 100, of FIG. 2. Here, the power distribution unit 100 is divided into three sections: a non-isolatable high voltage (NIHV) area 110, an isolatable high voltage (IHV) area 120, and a low voltage (LV) isolatable area 130, each including its own, respective, cover panel 111, 121, 131. The cover panels 111, 121, 131 may also be referred to as doors. Thus, according to this example embodiment, the isolation of components is taken a step further than in the related art, for the purposes of serviceability and operation. The separation into three areas allows electricians to operate and access the LV area 130 and remove fuses or make other modifications/controls without taking the high voltage areas 110 and 120 offline.

The IHV area 120 is a high temperature area. Its separation from the NIHV area 110 helps in keeping cooler the board in the IHV area 120. As this IHV area 120 is less accessible than the LV area 130, there is a benefit in maintaining more predictable temperatures. Any elements kept at cooler, more predictable temperatures will last longer without requiring access by an electrician. This IHV area 120 may include one or more AC-DC converters 152 configured to convert high voltage AC to low voltage DC.

Regarding the NIHV area 110, this area may include a unit voltage sensing circuit board 115 and one or more additional high voltage components, such as, but not limited to high voltage sensing boards, current sensing boards, and any control board requiring high voltage input. As shown in FIG. 3, the non-isolatable high voltage area 110 may include a Dual Mains Interface Board (DMIB) 151 which is a voltage and current sensing input board. Regarding the LV area 130, this area may include a control input circuit board 135, and one or more additional low voltage components such as, but not limited to any type of low voltage control board, panel board monitoring devices, subfeed monitoring devices, transformer monitors, switching control boards, or other units as would be understood by one of skill in the art. As shown in FIG. 3, the LV area 130 may include a panel monitor board 153.

As shown in FIG. 3, any one or more of the cover panels 111, 121, 131 may include one or more perforation regions 141 for ventilation airflow therethrough.

As described herein, "high voltage" may refer to voltages over 50 V A/C, for example, between 50-600 V A/C. "Low voltage" may refer to any voltage under about 50 V A/C or D/C.

By isolating a portion of the hazardous voltage components—those non-safety critical hazardous voltage components disposed in the IHV area 120—it is possible to disconnect hazardous voltage from the portion of the high voltage components in the IHV area 120 and enable service of those components. For example, the power supply of the control area, which converts hazardous voltage to low voltage for control components may be disconnected from the power supply, while maintaining the high voltage to the interface board disposed in the NIHV area 110. The power distribution unit 100 additionally includes disconnect devices 105, the operation of which disconnects hazardous voltages to be from the IHV area 120. The disconnect devices may include one or more of fuses, circuit breakers, switches, relays, or other electrical disconnect devices as would be understood in the art. The number of disconnect devices is not limited.

The design of the example embodiment of FIGS. 2 and 3 allows for the isolation, both physical and electrical, of the components with the highest temperatures from the remainder of the components, improving cooling performance. By isolating the portion of the high voltage components—those non-safety critical components disposed in the IHV 120—it is possible to disconnect the hazardous voltage from those components, allowing service thereof.

Figure 4:
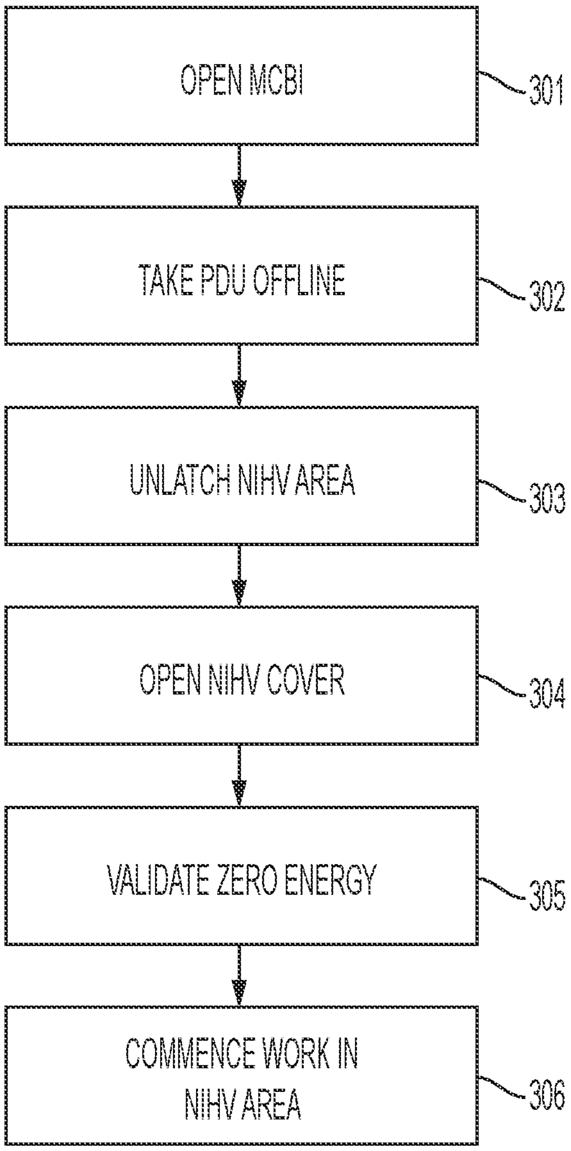
FIG. 4 illustrates a method of accessing a non-isolatable high voltage area of a power distribution unit, according to an example embodiment.

In order to access the NIHV area 110, the power distribution unit 100 must be taken completely offline, including both the monitoring power and the downstream power. FIG. 4 illustrates a method of accessing the NIHV area 110. The main input circuit breaker (MCBI) is first opened at 301. The top main circuit breaker 14*a* and the bottom main circuit breaker 20 in FIG. 1 are examples of an MCBI. The input power to the power distribution unit is then disconnected and locked out, upstream of the power distribution unit at 302. Any latching mechanism, such as one or more screws or door latches, for the NIHV area are opened at 303. The cover panel 111 for the NIHV area 110 is opened and/or removed at 304. A technician wearing suitable personal protective equipment (PPE) validates that there is zero energy in the NIHV area 110 using a digital multimeter or another device, as would be understood by one of skill in the art, at 305. Once it is confirmed that there is no energy in the NIHV area 110, the technician may remove their PPE and commence work on the units in the NIHV area 110, at 306.

Figure 5:
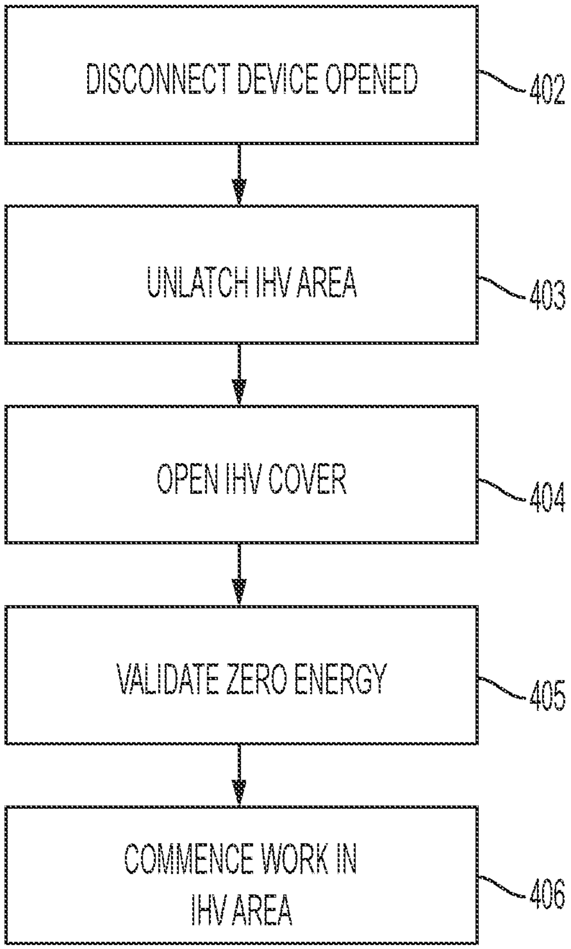
FIG. 5 illustrates a method of accessing an isolatable high voltage area of a power distribution unit, according to an example embodiment.

When accessing the IHV area 120, it is not necessary to take the power distribution unit 100 offline. FIG. 5 illustrates a method of accessing the IHV area 120. First the disconnect device, e.g. a fuse, connecting a power supply to the IHV area 120 is opened, cutting off the power to the IHV area 120, at 402. Any latching mechanism, such as one or more screws or door latches, for the IHV area 120 are opened, at 403. The cover panel 121 for the IHV area 120 is opened and/or removed, at 404. A technician wearing PPE validates that there is zero energy in the IHV area 120 using a digital multimeter or another device, as would be understood by one of skill in the art, at 405. Once it is confirmed that there is no energy in the IHV area 120, the technician may remove their PPE and commence work on the units in the IHV area 120, at 406.

Figure 6:
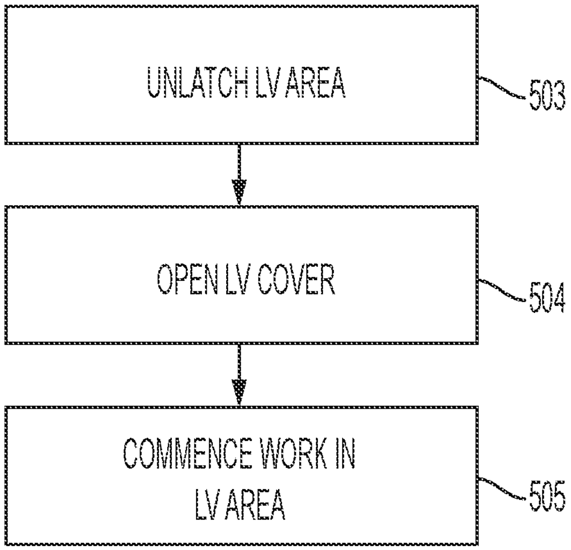
FIG. 6 illustrates a method of accessing a low voltage area of a power distribution unit, according to an example embodiment.

When accessing the LV area 130, it is also not necessary to take the power distribution unit 100 offline. FIG. 6 illustrates a method of accessing the LV area 130. The method includes: opening any latching mechanism, such as one or more screws or door latches, for the LV area 130, at 503; opening and/or removing the cover panel 131 for the LV area 130, at 504; and commencing work in the LV area 130, at 505. PPE is not required.

In some embodiments, a power distribution unit comprises: a non-isolatable high voltage area, an isolatable high voltage area, electrically isolated from the non-isolatable high voltage area, and at least one disconnect device, electrically connected between a high voltage power source and the isolatable high voltage area.

In some embodiments, the at least one disconnect device comprises a plurality of fuses.

In some embodiments, the at least one disconnect device comprises at least one of a circuit breaker, a switch, and a relay.

In some embodiments, the power distribution unit further comprises: a low voltage area, electrically isolated from each of the non-isolatable high voltage area and the isolatable high voltage area.

In some embodiments, the power distribution unit further comprises three cover panels, each one of the three cover panels mounted over a respective one of the non-isolatable high voltage area, the isolatable high voltage area, and the low voltage area.

In some embodiments, the power distribution unit further comprises a unit voltage sensing circuit board disposed in the non-isolatable high voltage area.

In some embodiments, the power distribution unit further comprises a dual mains interface board disposed in the non-isolatable high voltage area.

In some embodiments, the power distribution unit further comprises at least one alternating current/direct current converter disposed in the isolatable high voltage area.

In some embodiments, the power distribution unit further comprises a control input circuit board disposed in the low voltage area.

In some embodiments, an equipment cabinet comprises: a cabinet frame; and a door connected to the cabinet frame, the door comprising a power distribution unit comprising: a non-isolatable high voltage area, an isolatable high voltage area, electrically isolated from the non-isolatable high voltage area, and at least one disconnect device, electrically connected between a high voltage power source and the isolatable high voltage area.

In some embodiments, the at least one disconnect device comprises a plurality of fuses.

In some embodiments, at least one disconnect device comprises at least one of a circuit breaker, a switch, and a relay.

In some embodiments, the power distribution unit further comprises a low voltage area, electrically isolated from each of the non-isolatable high voltage area and the isolatable high voltage area.

In some embodiments, the cabinet frame further comprises: a pair of vertical wall panels, a top wall connected to each of the pair of vertical wall panels, and a bottom wall connected to each of the pair of vertical wall panels.

In some embodiments, the power distribution unit further comprises three cover panels, each one of the three cover panels mounted over a respective one of the non-isolatable high voltage area, the isolatable high voltage area, and the low voltage area.

In some embodiments, the power distribution unit further comprises a unit voltage sensing circuit board disposed in the non-isolatable high voltage area.

In some embodiments, the power distribution unit further comprises a dual mains interface board disposed in the non-isolatable high voltage area.

In some embodiments, the power distribution unit further comprises at least one alternating current/direct current converter disposed in the isolatable high voltage area.

In some embodiments, the power distribution unit further comprises a control input circuit board disposed in a low voltage area.

In some embodiments, a method of accessing a non-isolatable high voltage (NIHV) area of a power distribution unit comprising an isolatable high voltage (IHV) area, the NIHV area, and a low voltage (LV) area, wherein the NIHV area, the IHV area, and the LV area are each electrically isolated from each other, the method comprises: disconnecting a main input circuit breaker from the power distribution unit; locking out input power upstream from the power distribution unit; unlatching and opening a cover of the NIHV area; and validating there is no energy in the NIHV area prior to accessing any units disposed in the NIHV.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A power distribution unit comprising:

a non-isolatable high voltage area;

a unit voltage sensing circuit board disposed in the non-isolatable high voltage area;

a dual mains interface board disposed in the non-isolatable high voltage area;

an isolatable high voltage area, electrically isolated from the non-isolatable high voltage area, and at least one disconnect device, electrically connected between a high voltage power source and the isolatable high voltage area.

2. The power distribution unit of claim 1, wherein the at least one disconnect device comprises a plurality of fuses.

3. The power distribution unit of claim 1, wherein the at least one disconnect device comprises at least one of a circuit breaker, a switch, and a relay.

4. The power distribution unit of claim 1, further comprising: a low voltage area, electrically isolated from each of the non-isolatable high voltage area and the isolatable high voltage area.

5. The power distribution unit of claim 4, further comprising three cover panels, each one of the three cover panels mounted over a respective one of the non-isolatable high voltage area, the isolatable high voltage area, and the low voltage area.

6. The power distribution unit of claim 1, further comprising at least one alternating current/direct current converter disposed in the isolatable high voltage area.

7. The power distribution unit of claim 4, further comprising a control input circuit board disposed in the low voltage area.

8. An equipment cabinet comprising:

a cabinet frame; and a door connected to the cabinet frame, the door comprising a power distribution unit comprising:

a non-isolatable high voltage area;

a unit voltage sensing circuit board disposed in the non-isolatable high voltage area;

a dual mains interface board disposed in the non-isolatable high voltage area;

an isolatable high voltage area, electrically isolated from the non-isolatable high voltage area, and at least one disconnect device, electrically connected between a high voltage power source and the isolatable high voltage area.

9. The equipment cabinet of claim 8, wherein the at least one disconnect device comprises a plurality of fuses.

10. The equipment cabinet of claim 8, wherein the at least one disconnect device comprises at least one of a circuit breaker, a switch, and a relay.

11. The equipment cabinet of claim 8, wherein the power distribution unit further comprises a low voltage area, electrically isolated from each of the non-isolatable high voltage area and the isolatable high voltage area.

12. The equipment cabinet of claim 8, the cabinet frame further comprising:

a pair of vertical wall panels, a top wall connected to each of the pair of vertical wall panels, and a bottom wall connected to each of the pair of vertical wall panels.

13. The equipment cabinet of claim 11, wherein the power distribution unit further comprises three cover panels, each one of the three cover panels mounted over a respective one of the non-isolatable high voltage area, the isolatable high voltage area, and the low voltage area.

14. The equipment cabinet of claim 8, wherein the power distribution unit further comprises at least one alternating current/direct current converter disposed in the isolatable high voltage area.

15. The equipment cabinet of claim 8, wherein the power distribution unit further comprises a control input circuit board disposed in the low voltage area.

16. A method comprising:

accessing a non-isolatable high voltage (NIHV) area of a power distribution unit comprising an isolatable high voltage (IHV) area, the NIHV area, and a low voltage (LV) area, wherein the NIHV area, the IHV area, and the LV area are each electrically isolated from each other, and wherein the NIHV area includes a unit voltage sensing circuit board disposed and a dual mains interface board;

disconnecting a main input circuit breaker from the power distribution unit; locking out input power upstream from the power distribution unit; unlatching and opening a cover of the NIHV area; and validating there is no energy in the NIHV area prior to accessing any units disposed in the NIHV.

* * * * *